US010721532B2

(12) United States Patent
Tadayon

(10) Patent No.: US 10,721,532 B2
(45) Date of Patent: Jul. 21, 2020

(54) SYSTEMS AND METHODS FOR SYNCHRONIZING MEDIA AND TARGETED CONTENT

(76) Inventor: Hamed Tadayon, Los Angeles, CA (US)

( * ) Notice: Subject to any disclaimer, the term of this patent is extended or adjusted under 35 U.S.C. 154(b) by 1293 days.

(21) Appl. No.: 13/441,721

(22) Filed: Apr. 6, 2012

(65) Prior Publication Data

US 2012/0259697 A1    Oct. 11, 2012

Related U.S. Application Data

(60) Provisional application No. 61/472,436, filed on Apr. 6, 2011, provisional application No. 61/472,451, filed on Apr. 6, 2011.

(51) Int. Cl.
  *H04N 21/478*   (2011.01)
  *G06Q 30/02*    (2012.01)
  *H04N 21/81*    (2011.01)

(52) U.S. Cl.
  CPC ... *H04N 21/47815* (2013.01); *G06Q 30/0264* (2013.01); *H04N 21/812* (2013.01)

(58) Field of Classification Search
  CPC ........... G06Q 30/0264; G06Q 30/0267; H04N 21/812; H04N 21/8133; H04N 21/47815
  USPC .......................................... 705/14.61, 14.64
  See application file for complete search history.

(56) References Cited

U.S. PATENT DOCUMENTS

2008/0243603 A1*  10/2008  Chu et al. ....................... 705/14
2008/0290987 A1   11/2008  Li
2008/0300983 A1*  12/2008  Chen et al. ..................... 705/14
2009/0063277 A1*   3/2009  Bernosky et al. ............... 705/14
2009/0094113 A1*   4/2009  Berry ..................... G06Q 30/02
                                                    705/14.73
2009/0128335 A1    5/2009  Leung
2009/0210899 A1*   8/2009  Lawrence-Apfelbaum et al. .......
                                                    725/34

(Continued)

OTHER PUBLICATIONS

ABC app eavesdrops on your TV to synchronize interactive content using Nielsen tech (video) Sep. 18, 2010. http://www.engadget.com/2010/09/18/abc-app-eavesdrops-on-your-tv-to-synchronize-interactive-content/.*

(Continued)

*Primary Examiner* — Christine M Behncke
(74) *Attorney, Agent, or Firm* — Eric Karich; Karich & Associates

(57) ABSTRACT

Systems and methods for synchronizing media and targeted content are provided. A network connection is established with a mobile device. Timing data associated with playing media content is received from the mobile device. The playing media content is from a disconnected media outlet, where the content management server does not receive data from disconnected media outlet. Synchronizing is performed with the playing media content based on the timing data. Advertisement data associated with the playing media content is accessed. At least one synchronized advertisement is provided to the mobile device in synchronized time, where each synchronized advertisement is associated with a time code associated with the playing media content. An advertisement response from the mobile device is received. The advertisement response is associated with a selected advertisement selected from the at least one synchronized advertisement. An e-commerce transaction is initiated based on the advertisement response.

20 Claims, 7 Drawing Sheets

(56) References Cited

U.S. PATENT DOCUMENTS

| | | |
|---|---|---|
| 2010/0138561 A1 | 6/2010 | Church |
| 2010/0295993 A1 | 11/2010 | Oh |
| 2011/0035270 A1* | 2/2011 | Matsunaga et al. ....... 705/14.41 |
| 2011/0137731 A1* | 6/2011 | Ko ............................. 705/14.58 |
| 2012/0102516 A1* | 4/2012 | Perkins ........................... 725/14 |

OTHER PUBLICATIONS

Digital Watermarking, Civolution. Archived back at least as far as Nov. 5, 2010, http://www.civolution.com/technology/digital-audio-and-video-watermarking/.*

* cited by examiner

SYSTEMS AND METHODS FOR SYNCHRONIZING MEDIA AND TARGETED CONTENT

The present application claims priority to U.S. Provisional Application Ser. No. 61/472,436, filed on Apr. 6, 2011 and U.S. Provisional Application Ser. No. 61/472,451, filed on Apr. 6, 2011, all of which are herein incorporated by reference in their entirety for completeness of disclosure.

BACKGROUND OF THE INVENTION

1. Field of the Invention

Embodiments of the invention described herein pertain to the field of computer systems. More particularly, but not by way of limitation, one or more embodiments of the invention enable systems and methods for synchronizing media and targeted content.

2. Description of the Related Art

Advertisements provided alongside media content are known in the art. However, traditional media content advertising does not offer a point of sale for the advertised products.

Product placement in media content has been used to further monetize media content. However, it is difficult for viewers of the media content to identify and purchase the advertised products incorporated in media content.

To overcome the problems and limitations described above there is a need for systems and methods for synchronizing media and targeted content.

BRIEF SUMMARY OF THE INVENTION

One or more embodiments of systems and methods for correlating media and targeted content enable a content management server with at least one processor and a computer-readable medium with computer-readable instructions. Execution of the computer-readable instructions causes the at least one processor to execute steps including establishing a network connection with a mobile device. In one or more embodiments, the network connection includes a cellular network.

The steps further include receiving timing data associated with playing media content from the mobile device. The playing media content may include video. In one or more embodiments, the playing media content includes user-generated content. The playing media content is from a disconnected media outlet. The content management server does not receive data from disconnected media outlet. In one or more embodiments, the disconnected media outlet is selected from broadcast television, cable television, satellite television, and internet streaming.

The steps further include synchronizing with the playing media content based on the timing data.

The steps further include accessing advertisement data associated with the playing media content. In one or more embodiments, accessing the advertisement data includes connecting to a product database including a plurality of products associated with a plurality of media content and a plurality of time codes.

The steps further include providing at least one synchronized advertisement to the mobile device in synchronized time, where each synchronized advertisement is associated with a time code associated with the playing media content.

The steps further include receiving an advertisement response from the mobile device associated with a selected advertisement selected from the at least one synchronized advertisement.

The steps further include initiating an e-commerce transaction based on the advertisement response.

In one or more embodiments, the steps further include accepting a purchase request from the mobile device, and providing an interface to an e-commerce engine to complete the purchase request.

In one or more embodiments, the steps further include accepting new media content from a user device, accepting at least one timed product entry from the user device including new time code data and a product identifier, generating new advertisement data based on the new time code data and the product identifier, and storing the new advertisement data.

In one or more embodiments, the steps further include accepting a media content identifier associated with a selected media content, accepting a plurality of products and corresponding time codes associated with the selected media content, and storing the plurality of products, corresponding time codes in association with the selected media content in the advertisement database.

The timing data may include current time data, an identifier associated with the disconnected media outlet, an identifier associated with the playing media content, a start time, and/or a current play position associated with the playing media content. In one or more embodiments, the timing data includes manual data entered by a user into the mobile device.

In one or more embodiments, the timing data includes an audio sample from the playing media content. Synchronizing with the playing media content based on the timing data may include acoustic fingerprint syncing based on the audio sample.

Synchronizing with the playing media content based on the timing data includes broadcast syncing and/or manual syncing.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Systems and methods for synchronizing media and targeted content will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used herein, the term "mobile device" refers to any computing device capable of receiving data over any wireless network, including cellular telephones, smartphones, PDAs, tablets, laptops, desktop computers, hybrid devices, and any other device capable of receiving data over a wireless network.

As used herein, the term "wireless network" includes any network including a wireless portion. A wireless network may include cellular networks including cellular data networks, WPAN, WLAN, wireless mesh networks, WMAN, WWAN, and any combination thereof. A wireless network may be communicatively coupled with one or more wired networks, providing access to the wired network/s to one or more mobile devices.

As used herein, the term "server" refers to any computerized component/s, system/s or entities regardless of form adapted to provide data, files, applications, content, and/or other services to one or more other devices or entities over a network. A server may include distributed elements using systems and methods that are well known in the art.

As used herein, the term "advertisement" refers to any presentation referring to at least one product that is offered for sale. The presentation may be in any media form, including audio, video, text, graphics, and any combination thereof.

As used herein, the term "product" refers to any goods, services or combination thereof.

Figure 1:
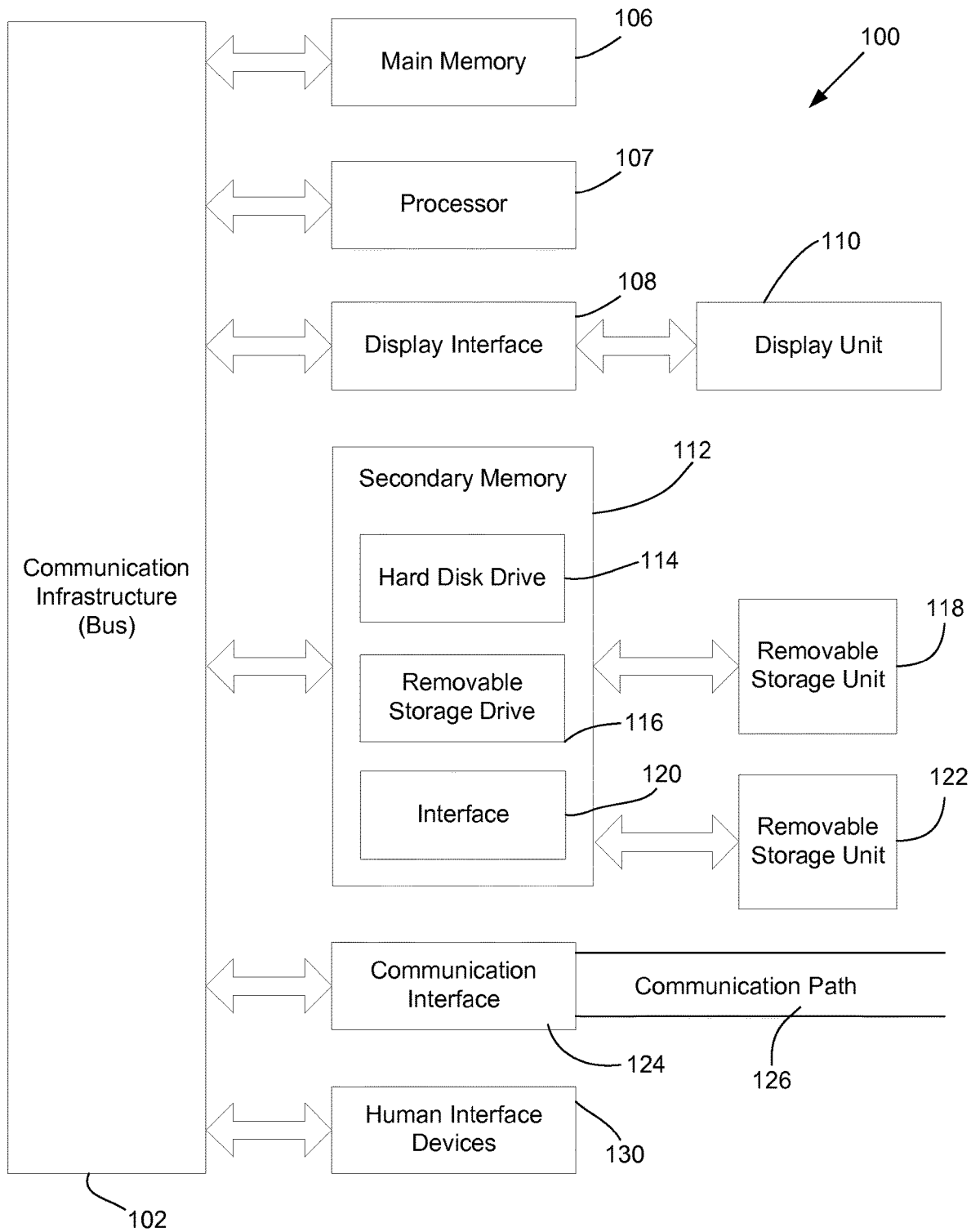
FIG. 1 illustrates a general-purpose computer and peripherals that when programmed as described herein may operate as a specially programmed computer capable of implementing one or more methods, apparatus and/or systems of the systems and methods for synchronizing media and targeted content disclosed herein.

FIG. 1 diagrams a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, cellular networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

Figure 2:
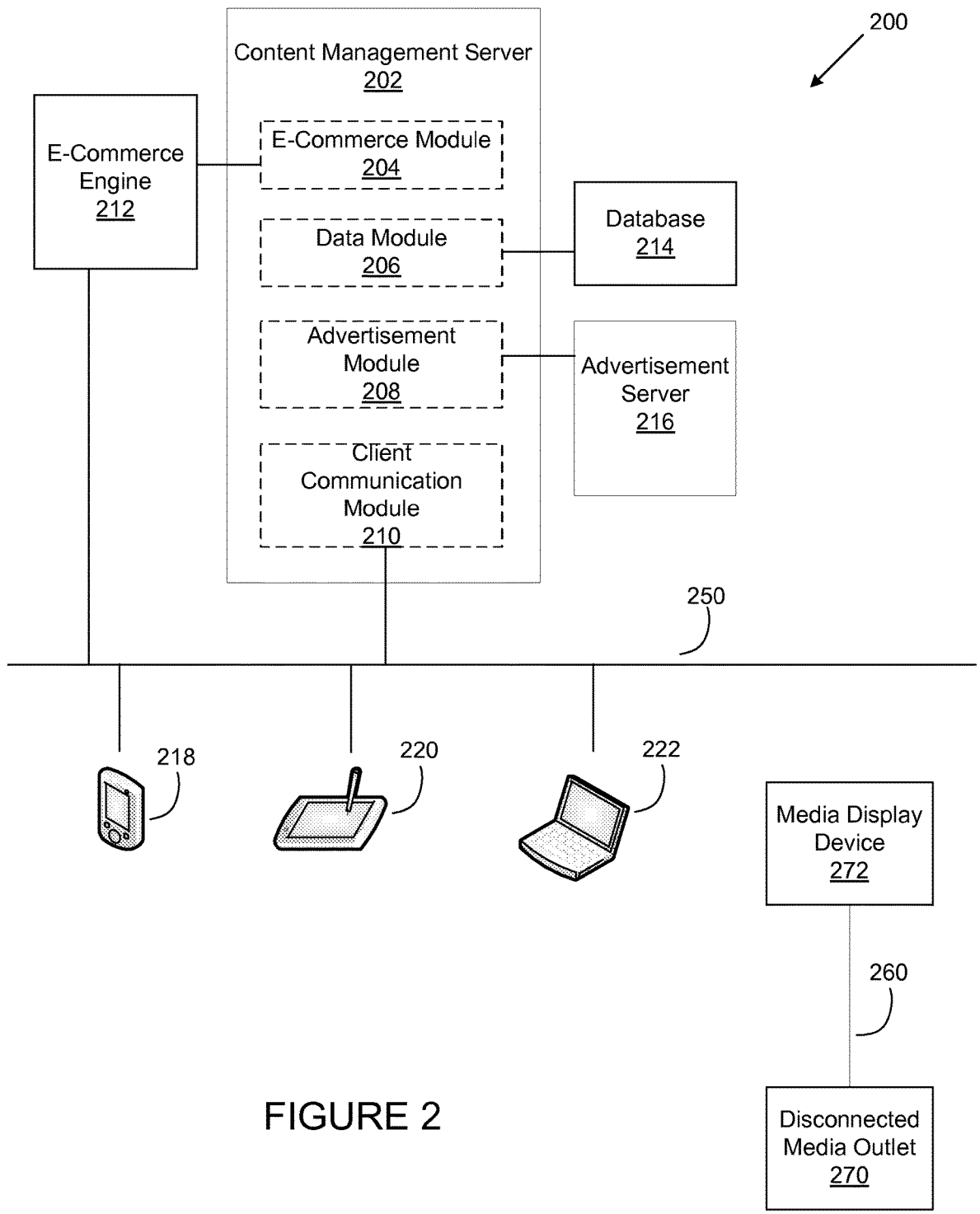
FIG. 2 is a diagram of an exemplary system for synchronizing media and targeted content in accordance with systems and methods for synchronizing media and targeted content disclosed herein.

FIG. 2 is a diagram of an exemplary system for synchronizing media and targeted content in accordance with systems and methods for synchronizing media and targeted content disclosed herein.

System 200 includes content management server 202. Content management server 202 is configured to provide at least one synchronized advertisement to mobile devices 218-222 over network 250. The advertisements are synchronized to media content currently being played on media display device 272. Network 250 may include Local Area Networks (LAN), Wide Area Networks (WAN), wireless networks, optical networks, distributed networks, cellular networks, the Internet and/or any combination thereof. Content management server 202 may be implemented on one or more computer systems.

The synchronized advertisements provided by content management server 202 to mobile devices 218-222 are synchronized to media content being displayed on media display device 272 via disconnected media outlet 270. The media content may include any media intended to be played over a set period of time, such as audio content, video content, streaming content, multimedia content slideshow content, or any other media content.

The media content may include scheduled content, such as a scheduled broadcast, a television show, a radio show, or any other continent where the media content is viewable during a scheduled time.

The media content may also include prerecorded content, including DVR content, streaming content, recorded content, content played from pre-recorded a medium, or any other content where a user initiates the viewing of the media content at a user-determined start time.

Disconnected media outlet 270 may include any source of media content, including but not limited to broadcast television, cable television, satellite television, and Internet streaming of scheduled content and/or pre-recorded content. The media content is provided to media display device 272 over disconnected media network 260. Disconnected media network 260 may include any broadcast network, television network, cable network, satellite network, wired network, the Internet, or any other network capable of distributing media from a disconnected media outlet 270 to media display device 272.

Content management server 202 is not communicatively coupled with disconnected media outlet 270, disconnected media network 260 or media display device 272. In one or more embodiments, at least one of disconnected media outlet 270, disconnected media network 260 and media display device 272 may be connected with network 250. However, no communication channel is established and no data is transferred over a network between these disconnected media elements and content management server 202.

Content management server 202 is communicatively coupled with database 214. Database 214 is configured to store any data in accordance with systems and methods for synchronizing media and targeted content. For example, database 214 may be configured to store consumer information, demographic information, product information, pricing information, media content information, disconnected media outlet information, advertisement information, e-commerce information, transaction information, and any other information relevant to systems and methods for synchronizing media and targeted content. Database 214 may include one or more databases that reside locally or remotely to one or more computer systems implementing content management server 202. In one or more embodiments, portions of data relevant to system 200 may be alternatively managed by one or more other servers, such as advertisement server 216 or eco-commerce engine 212, that provide the portions of data to content management server 202. In one or more embodiments, content management server 202 includes data module 206. Data module 206 may be any application, or component thereof, configured to interact with database 214.

Content management server 202 is communicatively coupled with advertisement server 216. Advertisement server 216 is configured to serve one or more advertisements to mobile devices 218-222. Advertisement server 216 is configured to serve the advertisements in a synchronized manner to media content being currently played on media display device 272. The advertisements may be served directly or through content management server 202. In one or more embodiments, content management server 202 includes advertisement module 208. Advertisement module 208 may be any application, or component thereof, configured to interact with advertisement server 216. One or more systems implementing one or more components of content management server 202 may also implement one or more components of advertisement server 216.

Content management server 202 is communicatively coupled with e-commerce engine 212. E-commerce engine 212 is configured to receive and process e-commerce transactions requested by mobile devices 218-222. An e-commerce transaction may be requested in response to a synchronized advertisement. E-commerce engine 212 may handle any e-commerce function and data, including shipping, payment authorization, payment information, and any other e-commerce function. E-commerce engine 212 may interact directly with mobile devices 218-222 or indirectly through content management server 202. In one or more embodiments, content management server 202 includes e-commerce module 204. E-commerce module 204 may be any application, or component thereof, configured to interact with e-commerce engine 212. One or more systems implementing one or more components of content management server 202 may also implement one or more components of e-commerce engine 212.

In one or more embodiments, content management server 202 includes client communication module 210. Client communication module 210 may be any application, or component thereof, configured to handle communication with mobile devices 218-222, including any communication required to enable functionality of e-commerce module 204 and/or advertisement module 208.

Figure 3:
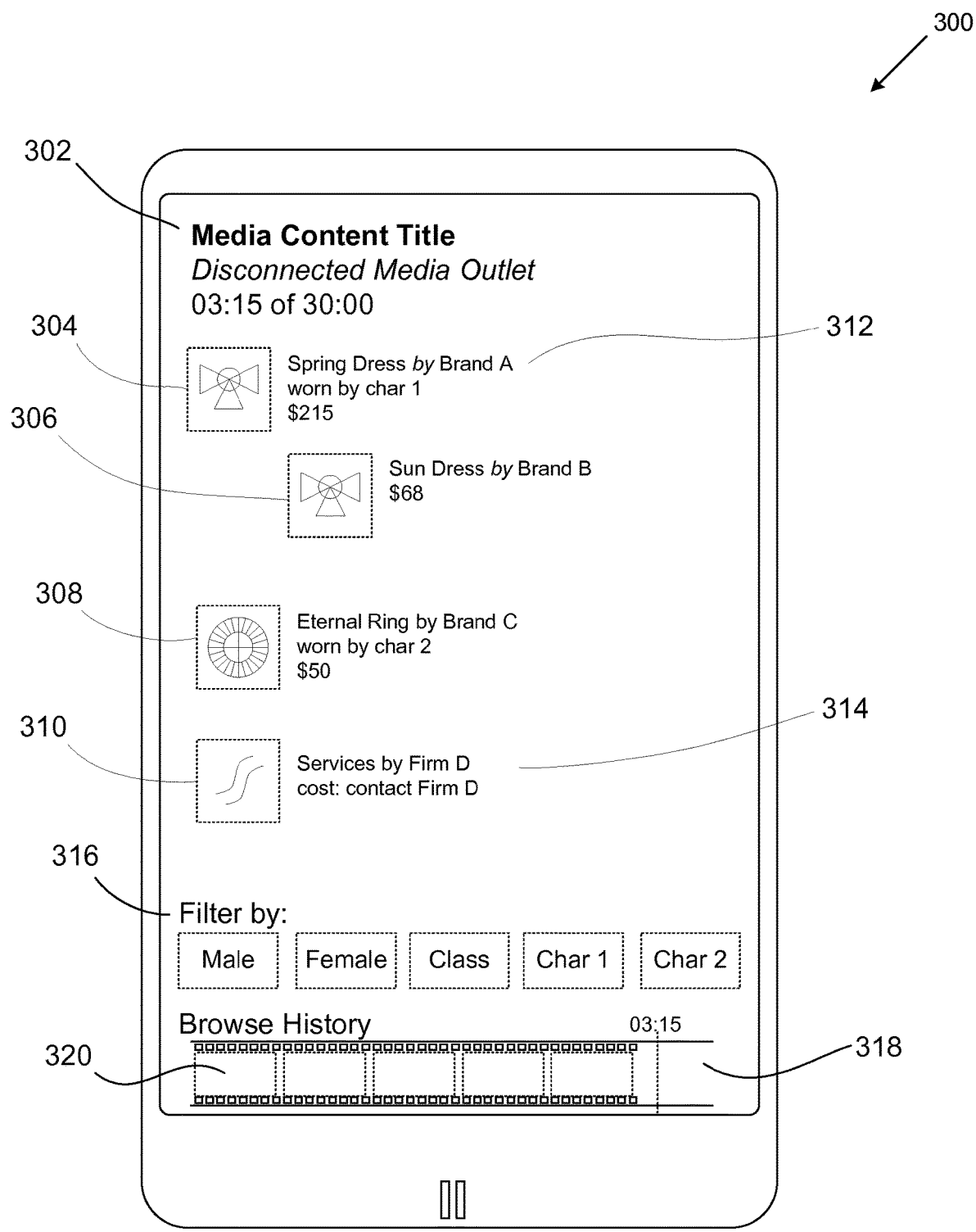
FIG. 3 illustrates an exemplary mobile device in accordance with the systems and methods for synchronizing media and targeted content disclosed herein.

FIG. 3 illustrates an exemplary mobile device in accordance with the systems and methods for synchronizing media and targeted content disclosed herein.

Mobile device 300 is configured to receive and display one or more synchronized advertisements 304-310 for one or more products that are associated with one or more segments of media content being currently played on a disconnected display device.

Mobile device 300 may be configured to display media content information 302 corresponding to the playing media content. Media content information 302 may include playing media content title, playing media content duration, playing media content scheduling information, media outlet information corresponding to a source of the media content, a current play position, other timing data, and any other data associated with the playing media content.

In one or more embodiments, synchronized advertisements 304-310 correspond to product appearing in the playing media content. A synchronized advertisement may be associated with a time code of the playing media content. As used herein, the term "time code" refers to any data identifying a single time, a range of time, or a segment with respect to the playing media content. A synchronized advertisement may be displayed on mobile device 300 for a predetermined duration, a time range, or a segment. Furthermore, a synchronized advertisement may be associated with one or more time codes such that a synchronized advertisement may be displayed one or more times over the duration of the playing media content.

Synchronized advertisements 304-310 may include product descriptions 312-134. Product descriptions 312-314 may include information associated with one or more goods and/or services, including but not limited to name, product line, brand, pricing, and other information associated with the product offered in synchronized advertisements 304-310. Product descriptions 312-314 may further include contextual information regarding the appearance of the associated product in the playing media content. Exemplary products that may be associated with synchronized advertisements 304-310 include clothing, makeup, accessories, vehicles, furniture, events, venues, services, and any other product that may be associated with media content.

In one or more embodiments, one or more alternative products may be offered in a synchronized advertisement, such as synchronized advertisement 306. The alternative product may offer goods or services that are similar to a product appearing in the playing media content. The alternative product may be in a different pricing range and/or directed to a different demographic, such as a political group, ideological group, age group, gender group, interest group, cultural group, geographic group, or any other demographic.

Synchronized advertisements 304-310 may be made available for purchase through mobile device 300, such as through an e-commerce user interface. Alternatively, one or more synchronized advertisements, such as synchronized advertisement 310, may display product information without offering a product for sale via an e-commerce transaction.

In one or more embodiments, a filtering user interface 316 may be provided on mobile device 300. Filtering user interface 316 allows a user to filter synchronized advertisements 304-310 using one or more filters. For example, the filters may filter by demographic classification, such as a political group, ideological group, age group, gender group, interest group, cultural group, geographic group or any other demographic. The filters may also be determined based on the context of the playing media content, such as by character, location, family, or any context specific to the playing media content.

In one or more embodiments, a browsing user interface 318 may be provided on mobile device 300. Browsing user interface 318 allows a user to browse the playing media content and/or synchronized advertisements 304-310 that have previously appeared or that will appear over the duration of the playing media content. In one or more embodiments, browsing user interface 318 allows a user to pause, adjust, skip forward, skip backward or otherwise change the current play position. For example, a user may pause the current play position through browsing user interface 318 when the user pauses the playing media content on the media display device. Browsing user interface 318 may further include one or more visual cues 320 associated with a time code of the playing media content. In one or more embodiments, nonvisual cues, such as segment number, start times, other timing information, seeing information, or other information may also be used.

Figure 4:
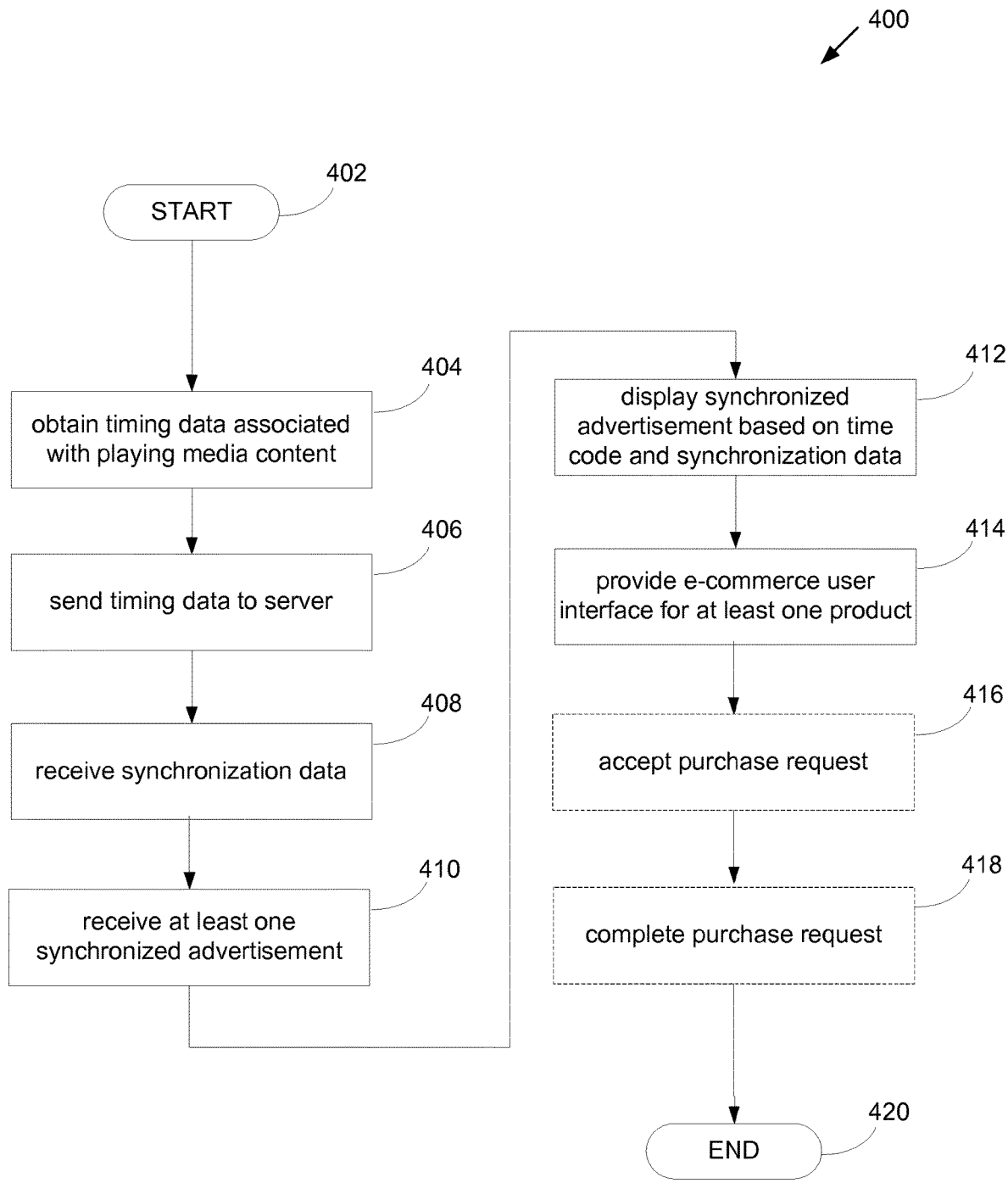
FIG. 4 is a flowchart for an exemplary process for requesting synchronized content in accordance with the systems and methods for synchronizing media and targeted content disclosed herein.

FIG. 4 is a flowchart for an exemplary process for requesting synchronized content in accordance with the systems and methods for synchronizing media and targeted content disclosed herein. In one or more embodiments, process 400 is performed by a client device, such as a mobile device. Process 400 begins at step 402.

Processing continues to step 404, where timing data associated with playing media content is obtained. The playing media content is associated with the disconnected media outlet. The timing data may include current time data, an identifier associated with the disconnected media outlet, an identifier associated with the playing media content, a start time, and/or a current play position associated with the playing media content. In one or more embodiments, the timing data includes manual data entered by a user into the mobile device. The timing may include an audio sample from the playing media content.

Processing continues to step 406, where the timing data is sent over a network to a server.

Processing continues to step 408, where synchronization data is received from the server.

The synchronization data is generated without communication from the disconnected media outlet. In one or more embodiments, the synchronization data is generated by the server based on the timing data. Synchronizing with the playing media content based on the timing data may include acoustic fingerprint syncing based on the audio sample. Synchronizing with the playing media may be performed based on broadcast syncing and/or manual syncing.

In manual syncing, a user is offered a user interface on the mobile device to activate at the beginning of the playing media content. Synchronized advertisements are displayed based on the time elapsed from the time the user pressed the button, which corresponds to an estimated current play position. In manual syncing, a user may also be given interface to select a current play position, such as the interface described in FIG. 3.

In broadcast syncing, a user is offered a user interface on the mobile device to select a media outlet selection. The playing media content is determined based on the media it Show that is currently broadcast, such as through broadcast television, cable television, satellite television. Advertisements are displayed based on the media outlet selection and time zone data, which may be determined automatically based on location information. An estimated current play position may be determined based on the media outlet selection and sent to scheduling information on the media content scheduled to currently playing on the selected media outlet.

In acoustic fingerprint syncing, a short audio sample is recorded on the mobile device. The short audio sample is recorded using a device in the proximity of the media display device that is showing the playing media content. In one or more embodiments, the sample is matched to identify the playing media content based on a database of acoustic fingerprint data. In one or more embodiments, the sample is used to estimate the current play position.

Processing continues to step 410, where at least one synchronized advertisement is received. Each synchronized advertisement is associated with at least one time code associated with the playing media content. The time code may identify a single time, a range of time, or a segment with respect to the playing media content. In one or more embodiments, the at least one synchronized advertisement is received from an advertisement server.

Processing continues to step 412, where a synchronized advertisement is displayed based on the time code and synchronization data.

Processing continues to step 414, where an e-commerce user interface is provided for at least one product associated with at least one synchronized advertisement.

Processing continues to optional step 416, where a purchase request from a user of the e-commerce user interface is accepted.

Processing continues to optional step 418, where the purchase request is completed over the network. In one or more embodiments, the purchase request is completed with an e-commerce engine.

Processing continues to step 420, where process 400 terminates.

Figure 5:
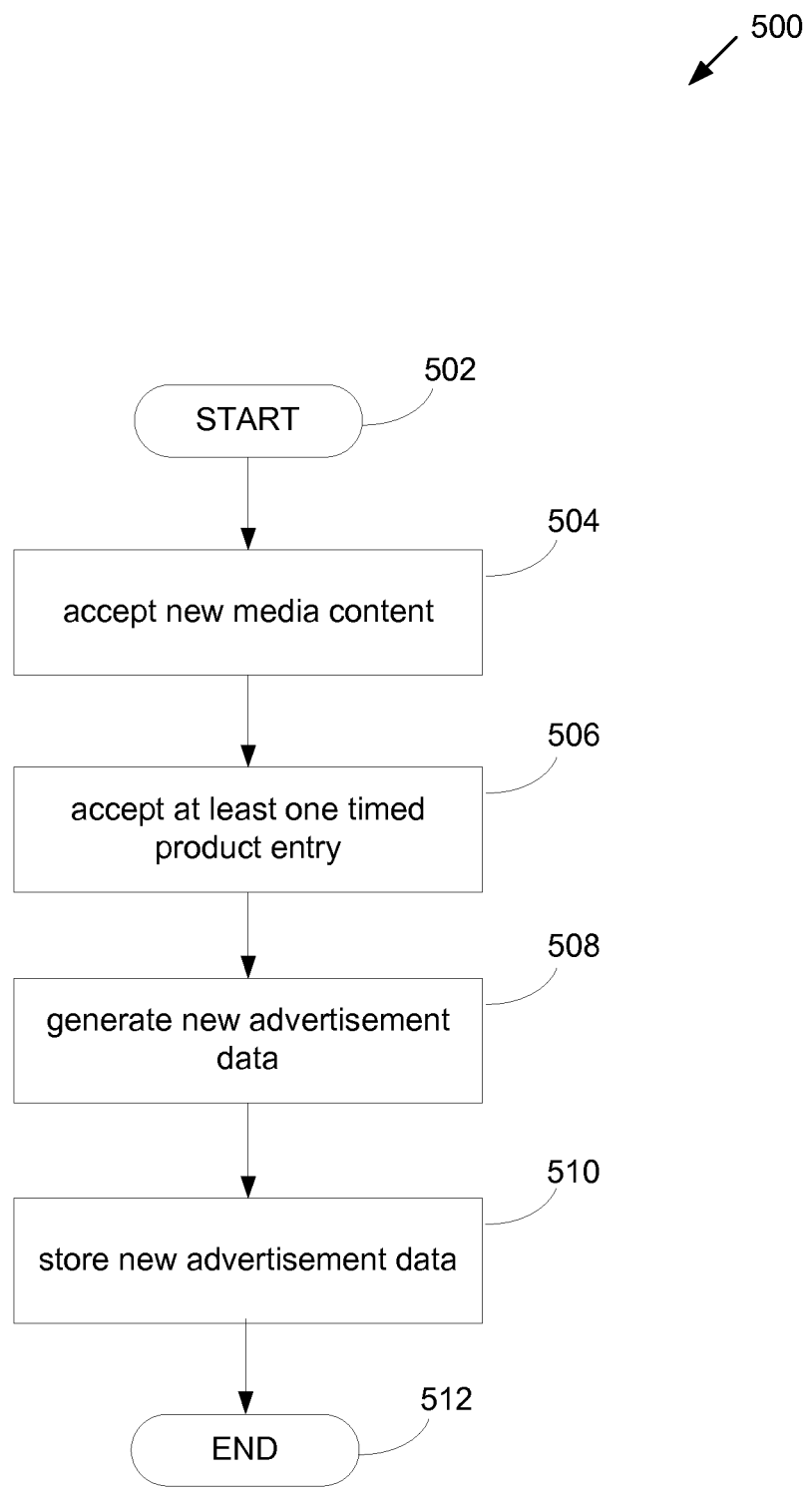
FIG. 5 is a flowchart for an exemplary process for processing new media and targeted content in accordance with the systems and methods for synchronizing media and targeted content disclosed herein.

FIG. 5 is a flowchart for an exemplary process for processing new media and targeted content in accordance with the systems and methods for synchronizing media and targeted content disclosed herein. Process 500 begins at step 502.

Processing continues to step 504, where new media content is accepted from the user device. The new media content may be accepted as an identifier that identifies new media content that is accessible over a network. The new media content may also be a complete media file. In one or more embodiments, the new media content is user generated content. The new media content may be content that is generated and recorded by the user device. The user device may refer to mobile devices to which synchronized advertisements are provided. Alternatively, the user device may refer to any computing device that may be configured to upload new media content information in accordance with systems and methods for synchronizing media and targeted content.

Processing continues to step 506, where at least one time product entry is accepted from the user device. The at least one time product entry includes new time code data and a product identifier. The product identifier identifies one or more goods, services, or combination thereof. The new time code data may identify a single time, a range of time, or a segment of the new media content that is associated with the product entry. Multiple new time codes may be associated with a single product entry.

Processing continues to step 508, where new advertisement data is generated based on the new time code data and the product identifier.

Processing continues to step 510, where the new advertisement data is stored in association with the new media content.

Processing continues to step 512, where process 500 terminates.

Figure 6:
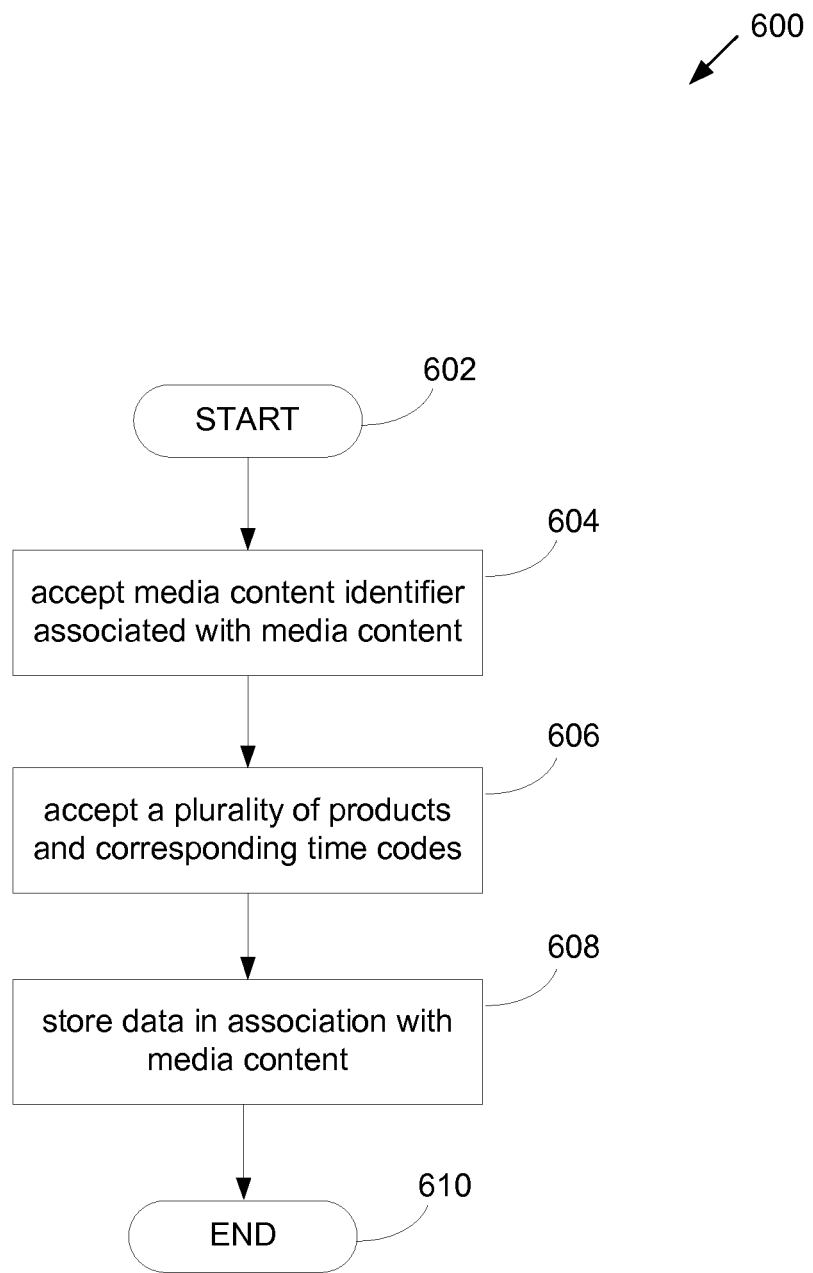
FIG. 6 is a flowchart for an exemplary process for processing targeted content in accordance with the systems and methods for synchronizing media and targeted content disclosed herein.

FIG. 6 is a flowchart for an exemplary process for processing targeted content in accordance with the systems and methods for synchronizing media and targeted content disclosed herein. Process 600 begins at step 602.

Processing continues to step 604, where a media content identifier associated with a selected media content is accepted. The media content identifier may include any name, web address, ISBN, serial number, product tag, or any other identifier that uniquely identifies the selected media content.

Processing continues to step 706, where a plurality of products and corresponding time codes associated with the selected media content are accepted. The time code data may identify a single time, a range of time, or a segment of the selected media content that is associated with the product entry. Multiple time codes may be associated with a single product.

Processing continues to step 708, where the plurality of products and corresponding time codes are stored in association with the selected media content.

Processing continues to step 710, where process 700 terminates.

Figure 7:
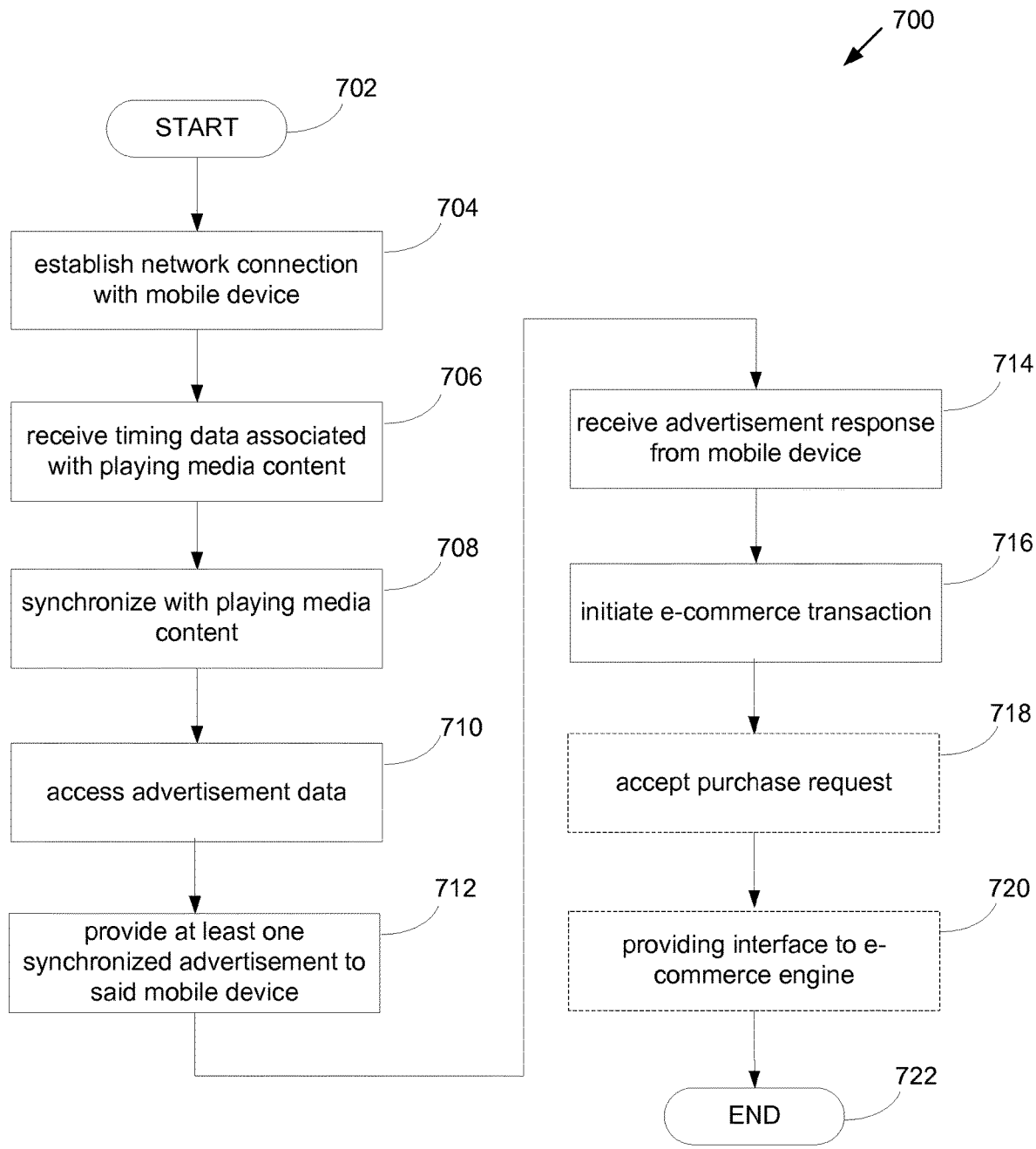
FIG. 7 is a flowchart for an exemplary process for providing synchronized targeted content in accordance with the systems and methods for synchronizing media and targeted content disclosed herein.

FIG. 7 is a flowchart for an exemplary process for providing synchronized targeted content in accordance with the systems and methods for synchronizing media and targeted content disclosed herein. In one or more embodiments, process 700 is performed by a server device, such as a content management server. Process 700 begins at step 702.

Processing continues to step 704, where a network connection is established with a mobile device.

Processing continues to step 706, where timing data associated with playing media content is received from the mobile device. The playing media content is associated with a disconnected media outlet. The timing data may include current time data, an identifier associated with the disconnected media outlet, an identifier associated with the playing media content, a start time, and/or a current play position associated with the playing media content. In one or more embodiments, the timing data includes manual data entered by a user into the mobile device. The timing may include an audio sample from the playing media content.

Processing continues to step 708, which involve synchronizing with the playing media content based on the timing data. The synchronization is performed based on the timing data without communication from the disconnected media outlet. Synchronizing with the playing media content based on the timing data may include acoustic fingerprint syncing based on the audio sample. Synchronizing with the playing media content based on the timing data may be performed based on broadcast syncing and/or manual syncing.

Processing continues to step 710, where advertisement data associated with the playing media content is accessed. The advertisement data may reside on a local or remote database, and may be accessed directly or via an advertisement server.

Processing continues to step 712, where at least one synchronized advertisement is provided to the mobile device in synchronized time. Each synchronized advertisement is associated with a time code associated with the playing media content. The time code may identify a single time, a range of time, or a segment with respect to the playing media content. A synchronized advertisement may be associated with one or more time codes. In one or more embodiments, the synchronized advertisement is provided in synchronized time by providing the synchronized advertisement at about the time associated with the time code. Cue time syncing may be performed by entering cue times for each of the products being sold using the system. Synchronized advertisements are delivered based on that cue time, which is based on the current play position detected. Alternatively, the synchronized advertisement is provided any period before the associated time code will be reached in the playing media content. In this case, the mobile device may determine the proper timing to display the synchronized advertisement based on the time code and synchronization data determined by the server.

Processing continues to step 714, where an advertisement response is received from the mobile device. The advertisement response is associated with a selected advertisement, which is selected from the at least one synchronized advertisement.

Processing continues to step 716, where an e-commerce transaction is initiated based on the advertisement response.

Processing continues to optional step 718, where a purchase request is accepted from the mobile device.

Processing continues to optional step 720, where an interface to an e-commerce engine is provided to complete the purchase request.

Processing continues to step 722, where process 700 terminates.

While the invention herein disclosed has been described by means of specific embodiments and applications thereof, numerous modifications and variations could be made thereto by those skilled in the art without departing from the scope of the invention set forth in the claims.

What is claimed is:

1. A method for synchronizing media and targeted content comprising:
    a content management server establishing a network connection with a mobile device;
    said content management server receiving timing data associated with playing media content from said mobile device, wherein said playing media content is from a media outlet disconnected from said content management server;
    said content management server synchronizing with said playing media content based on said timing data;
    said content management server accessing advertisement data associated with said playing media content;
    said content management server providing at least one synchronized advertisement to said mobile device for display in synchronized time, wherein each synchronized advertisement is associated with a time code associated with said playing media content;
    said content management server receiving a user response from said mobile device as a result of one of said at least one synchronized advertisement; and
    said content management server initiating an e-commerce transaction between said mobile device user and a sponsor of said one of said at least one synchronized advertisement based on said user response.

2. The method of claim 1, further comprising:
    said content management server accepting a purchase request from said mobile device; and
    said content management server providing an interface to an e-commerce engine to complete said purchase request.

3. The method of claim 1, wherein said playing media content comprises video.

4. The method of claim 1, wherein said disconnected media outlet is selected from broadcast television, cable television, satellite television, and internet streaming.

5. The method of claim 1, wherein said playing media content comprises user-generated content.

6. The method of claim 1, further comprising:
    said content management server accepting new media content from a user device;
    said content management server accepting at least one timed product entry from said user device, wherein said at least one timed product entry comprises new time code data and a product identifier;
    said content management server generating new advertisement data based on said new time code data and said product identifier; and
    said content management server storing said new advertisement data.

7. The method of claim 1, wherein accessing said advertisement data comprises connecting to a product database comprising a plurality of products associated with a plurality of media content and a plurality of time codes.

8. The method of claim 7, further comprising:
    said content management server accepting a media content identifier associated with a selected media content;
    said content management server accepting a plurality of products and corresponding time codes associated with said selected media content; and
    said content management server storing said plurality of products, corresponding time codes in association with said selected media content in said advertisement database.

9. The method of claim 1, wherein said network connection comprises a cellular network.

10. The method of claim 1, wherein said timing data comprises current time data.

11. The method of claim 1, wherein said timing data comprises an identifier associated with said disconnected media outlet.

12. The method of claim 1, wherein said timing data comprises an identifier associated with said playing media content.

13. The method of claim 1, wherein said timing data comprises a start time.

14. The method of claim 1, wherein said timing data comprises a current play position associated with said playing media content.

15. The method of claim 1, wherein said timing data comprises manual data entered by a user into said mobile device.

16. The method of claim 1, wherein said timing data comprises an audio sample from said playing media content.

17. The method of claim 16, wherein synchronizing with said playing media content based on said timing data comprises acoustic fingerprint syncing based on said audio sample.

18. The method of claim 1, wherein synchronizing with said playing media content based on said timing data comprises broadcast syncing.

19. The method of claim 1, wherein synchronizing with said playing media content based on said timing data comprises manual syncing.

20. A system for synchronizing media and targeted content comprising:
    a media outlet playing media content; and
    a mobile device receiving said media content;
    a content management server in communication with said mobile device via a network connection, wherein said media outlet is disconnected from said content management server, said content management server performing a process comprising:
    receiving timing data associated with said media content from said mobile device;
    synchronizing with said media content based on said timing data;

accessing advertisement data associated with said media content;

providing at least one synchronized advertisement to said mobile device for display in synchronized time, wherein each of said at least one synchronized advertisement is associated with a time code associated with said media content;

receiving user response from said mobile device as a result of one of said at least one synchronized advertisement; and initiating an e-commerce transaction between said mobile device user and a sponsor of said one of said at least one synchronized advertisement base on said user response.

* * * * *